United States Patent
Faber

(10) Patent No.: US 10,442,230 B2
(45) Date of Patent: Oct. 15, 2019

(54) PLATE SUPPORT FOR A SELF-INKING STAMP

(71) Applicant: COLOP STEMPELERZEUGUNG SKOPEK GESELLSCHAFT M.B.H. & CO. KG, Wels (AT)

(72) Inventor: Ernst Faber, Wels (AT)

(73) Assignee: COLOP STEMPELERZEUGUNG SKOPEK GESELLSCHAFT M.B.H. & CO. KG., Wels (AT)

( * ) Notice: Subject to any disclaimer, the term of this patent is extended or adjusted under 35 U.S.C. 154(b) by 0 days.

(21) Appl. No.: 15/905,987

(22) Filed: Feb. 27, 2018

(65) Prior Publication Data

US 2018/0244091 A1    Aug. 30, 2018

(30) Foreign Application Priority Data

Feb. 28, 2017    (AT) .............................. A 50161/2017

(51) Int. Cl.
| | |
|---|---|
| *B41K 1/02* | (2006.01) |
| *B41K 1/40* | (2006.01) |
| *B41K 1/08* | (2006.01) |
| *B29C 45/26* | (2006.01) |
| *B29C 45/00* | (2006.01) |
| *B29L 31/00* | (2006.01) |

(52) U.S. Cl.
CPC ............ *B41K 1/40* (2013.01); *B29C 45/0053* (2013.01); *B29C 45/2628* (2013.01); *B41K 1/02* (2013.01); *B41K 1/08* (2013.01); *B29C 45/00* (2013.01); *B29C 2045/0093* (2013.01); *B29L 2031/767* (2013.01)

(58) Field of Classification Search
CPC ... B41K 1/02; B41K 1/08; B41K 1/36; B41K 1/38; B41K 1/40; B29C 45/2628; B29C 45/0053; B29C 45/00; B29L 2031/767
USPC ................ 101/327, 333, 334, 103, 104, 105
See application file for complete search history.

(56) References Cited

U.S. PATENT DOCUMENTS

| | | | |
|---|---|---|---|
| 4,432,281 A | 2/1984 | Wall et al. | |
| 5,152,223 A * | 10/1992 | Mairon | .................... B41K 1/40 101/104 |
| 6,453,813 B1 | 9/2002 | Faber | |
| 7,520,221 B2 | 4/2009 | Ameshofer | |
| 2005/0056173 A1 | 3/2005 | Dour | |
| 2008/0087180 A1* | 4/2008 | Ameshofer | ............. B41K 1/36 101/334 |

(Continued)

FOREIGN PATENT DOCUMENTS

| | | |
|---|---|---|
| AT | 5826 U1 | 12/2002 |
| WO | 00/21759 A1 | 4/2000 |
| WO | 2006/079130 A1 | 8/2006 |

OTHER PUBLICATIONS

Austrian Office Action in A 50161/2017-1, dated Dec. 22, 2017, with English translation of relevant parts.

*Primary Examiner* — Leslie J Evanisko
(74) *Attorney, Agent, or Firm* — Collard & Roe, P.C.

(57) ABSTRACT

A method for manufacturing a plate support for a self-inking stamp and plate support with a print side for attaching a text plate to the plate support, with two journals defining a swiveling axis of the plate support about which swiveling axis the plate support is mounted to swivel when used in a self-inking stamp, and with a reinforcing axle at least partially penetrating the two journals, integrally forms the journals with the plate support.

12 Claims, 3 Drawing Sheets

(56) References Cited

U.S. PATENT DOCUMENTS

2009/0255427 A1* 10/2009 Faber ...................... B41K 1/04
101/334

* cited by examiner

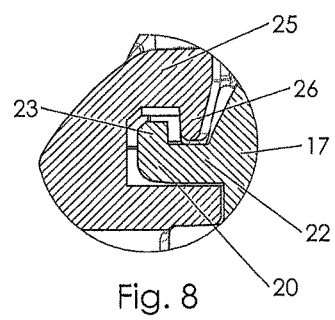
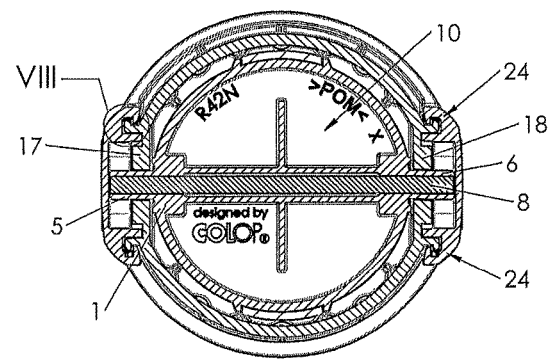
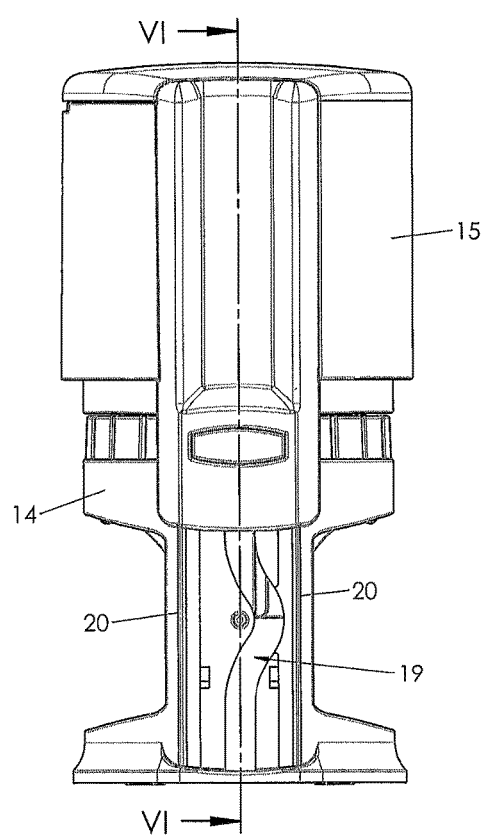
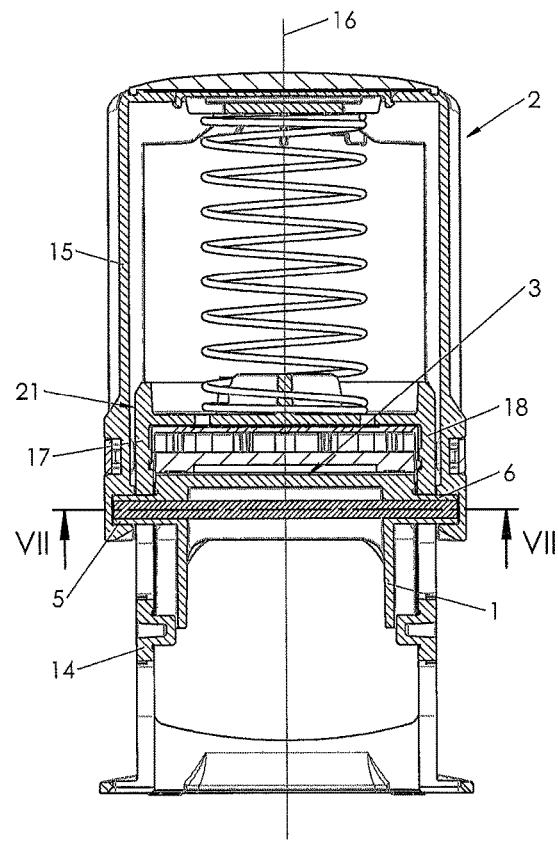
Fig. 8
Fig. 7
Fig. 5
Fig. 6

PLATE SUPPORT FOR A SELF-INKING STAMP

CROSS REFERENCE TO RELATED APPLICATIONS

Applicant claims priority under 35 U.S.C. § 119 of Austrian Application No. A 50161/2017 filed Feb. 28, 2017, the disclosure of which is incorporated by reference.

BACKGROUND OF THE INVENTION

1. Field of the Invention

The invention relates to a plate support for a self-inking stamp with a print side for attaching a text plate to the plate support, with two journals defining a swiveling axis of the plate support about which swiveling axis the plate support is mounted to swivel when used in a self-inking stamp, and with a reinforcing axle which at least partially penetrates the two journals, and to a self-inking stamp having such a plate support. Moreover, the invention relates to a method for manufacturing a plate support for a self-inking stamp, in particular a plate support of the type and structure indicated above more in detail, wherein the plate support is manufactured by injection molding in a mold.

The print side of the plate support is preferably a plane surface to which, for example, a bonding sheet may be attached for gluing it onto a text plate. The journals extend, for example, from the plate support laterally beyond the base of the print side so that they may be coupled with an actuating part (e. g. an actuating bow) of a self-inking stamp, through a housing of a self-inking stamp, the housing essentially surrounding the plate support. The swiveling axis defined by the journals is preferably centered with respect to the print side and arranged in a plane parallel to the print side so that a force exerted onto the journals via the actuating part may be uniformly transmitted to the print side and distributed thereon. The reinforcing axle is arranged inside the two journals, in particular in the core thereof, and preferably along the swiveling axis. A central longitudinal axis of the reinforcing axle and the swiveling axis of the plate support are here preferably aligned (i.e. the axes are lying on the same straight line).

The reinforcing axle may preferably be designed with essentially the same geometry for increasing the stiffness of the plate support against bending compared to an integrally formed plate support (i.e. made of a single material). It then advantageously supports a uniform distribution of the force exerted onto the journals along the swiveling axis of the plate support, the force acting on a text plate attached to the print side, during printing.

Furthermore, the reinforcing axle may be advantageously configured to reinforce or stabilize the arrangement of the journals to protect, for example, the journals from breaking off.

The ends of the reinforcing axle of the plate support are essentially enclosed by the journals at least in a plane transverse to the swiveling axis of the plate support to reduce or avoid direct contact between the reinforcing axle and a bearing in the actuating part of a self-inking stamp, and one-sided signs of wear and tear caused thereby.

2. Description of the Related Art

Such plate supports with enclosed reinforcing axles are already known. Separately manufactured guide sleeves are used for them (e. g. guide sleeves of polyoxymethylene, briefly POM) and put onto the two ends of the reinforcing axle. A disadvantage is the considerable effort for the manufacture of the plate support caused by the manufacture and assembly of the two additional parts (the guide sleeves).

SUMMARY OF THE INVENTION

It is an object of the invention to provide a plate support that can be manufactured at reduced efforts and costs, as well as a method for manufacturing such a plate support.

In the plate support according to the invention of the type mentioned in the beginning, the journals are integrally formed with the plate support.

In the method according to the invention of the type mentioned in the beginning, a cavity of the mold is designed for the integral manufacture of the two journals, and the mold comprises a core in the region of the two journals.

By the single-piece design of the journals with the plate support, the journals may be manufactured in one procedure step, in particular during the molding of the plate support. A separate manufacture and assembly of guide sleeves may thus be omitted, thereby reducing the efforts for the manufacture of the finished plate support.

In a first preferred variation of the present method, the core may be removed after the injection molding process and replaced by a reinforcing axle. That means, the journals are produced with recesses or holes into which the reinforcing axle may be installed at a later time. Preferably, the core may extend over the complete length of the journals in parallel to the swiveling axis of the plate support so that the core may be easily pushed and/or pulled laterally from the molded workpiece (essentially the plate support without reinforcing axle).

In a second preferred variation of the present method, the core may be formed by a reinforcing axle which remains within the plate support after the injection molding process. In particular, the reinforcing axle may be inserted into the mold before the manufacture of the plate support. The reinforcing axle may thus be directly covered with material at least in sections. This variation is advantageous in that a separate assembly of the reinforcing axle in the plate support becomes superfluous, and the manufacturing efforts and costs are thus further reduced. The plate support is essentially manufactured as a two-component (2K) part, the one component being the material of the reinforcing axle or the reinforcing axle as such, and the other component being e. g. a thermoplastic of which the plate structure is made. The material of the reinforcing axle is preferably a material different from the material of which the rest of the plate support is made or will be made, and/or the reinforcing axle has—e. g. due to a different manufacturing process—a material structure different from that of the rest of the plate support.

It turned out to be advantageous for the reinforcing axle to completely penetrate the journals, wherein the ends of the reinforcing axle are preferably flush with the ends of the respective journal. The reinforcing axle does not extend laterally beyond the journals. In this case, the journals are reinforced over their complete lengths by the reinforcing axle so that the reinforcing axle may absorb any force (i.e. at any point) acting on the journals.

Preferably, a central part of the reinforcing axle between the journals is accessible and in particular visible from a back side of the plate support, the back side being opposite the print side. Thereby, the reinforcing axle may be held in position during the manufacture, for example gripped around by 180° and/or held with a magnet.

Thereby, a simple and reliable mounting of the reinforcing axle during the coating process according to the second preferred variation of the present method may be achieved. Moreover, the visibility of the reinforcing axle, in particular when an easily identifiable material such as steel is used, is advantageous in that the particular property and quality of the plate support and of a self-inking stamp manufactured with it may be easily identified and inspected by the user.

The reinforcing axle may preferably be made of metal, in particular of steel. Basically, any stiff material is suited for the reinforcing axle, i.e. any material imparting the desired stiffness and/or resistibility to the text plate or at least to the journals. The use of steel, i.e. steel axles as reinforcing axles, is sometimes demanded and expected by users so that it is also particularly desirable from an economic point of view.

The reinforcing axle may moreover comprise at least one groove extending essentially transverse to the swiveling axis (e. g. a circumferential groove) which groove is engaged with the rest of the plate support when the reinforcing axle is mounted. Thereby, a lateral translation of the reinforcing axle within the journals may be blocked.

Moreover, the invention relates to a self-inking stamp comprising an actuating part shiftable with respect to a housing along an axis of translation, wherein a plate support, preferably a plate support according to one of the variations illustrated more in detail above, is coupled to the actuating part, wherein the housing comprises one guiding slot each in two opposite side walls for receiving the journals of the plate support, wherein at least one guide rail is provided at at least one of the side walls for guiding the actuating part along the axis of translation. The guidance achieved by the guide rail is arranged in the direction parallel to the axis of translation, i.e. the guide rail is arranged in parallel to the axis of translation and/or adjacent to a guiding slot.

In connection with such a self-inking stamp, it proved to be particularly advantageous if at least one profile section of the guide rail and a corresponding bearing bush at the actuating part are formed such that the bearing bush is engaged with the guide rail in the profile section in a blocking position such that the bearing bush is blocked against a movement parallel to the swiveling axis of the plate support. Thereby, a bending open of the stamp, i.e. a lateral lifting of the actuating part from the housing transverse to the direction of translation, which can lead to a release of a journal of the plate support and thus to an undesired decomposition of the stamp, may be blocked. By the profile section and the bearing bush, the stability and resistibility of the self-inking stamp are thus increased in the blocking position.

Here, it is particularly advantageous for the guide rail to comprise, in the region of the profile section, an oblong indentation, in particular a groove, formed in a direction transverse to the swiveling axis of the plate support, and for the bearing bush to comprise a bush profile corresponding to the indentation. Such an oblong indentation or groove and the corresponding bush profile may be manufactured easily in one processing step with the guide rail or the actuating part, respectively.

Advantageously, the profile of the guide rail in the profile section and the profile of the bearing bush may comprise a first leg parallel to the swiveling axis of the plate support, and a second leg transverse to the swiveling axis of the plate support, the second legs of the profiles being engaged in the blocking position. Here, in the blocking position, the second leg of the profile of the guide rail may be arranged in the profile section at the inner side of the second leg of the profile of the bearing bush. That means, the profile of the guide has an L-shape. Such a shape permits particularly reliable blocking because the two second legs are arranged transverse to the swiveling axis of the plate support and thus completely absorb a force directed in parallel to the swiveling axis without deflecting it.

Furthermore, it turned out to be advantageous for the profile section of the guide rail to only extend in one half of the guide rail, the half facing the actuating part (i.e. the half closer to the actuating part). Preferably, the profile section ends above the central point of the guide rail, in particular at or above a lower edge of the actuating part in a rest position of the self-inking stamp. In this case, the rest position corresponds to a blocking position of the self-inking stamp. This arrangement is advantageous in that in the pressed state of the self-inking stamp, the side walls, for example with bow brackets, of the actuating part are free (unblocked), and thereby the assembly of a text plate in the actuating part may be performed without any problems (i.e. the bow snaps over the journals of the plate support).

BRIEF DESCRIPTION OF THE DRAWINGS

The invention will be further illustrated below with respect to particularly preferred exemplified embodiments which, however, are not intended to restrict the invention, and with reference to the drawings. The drawings show in detail:

FIG. 5 a side view of the self-inking stamp according to FIG. 4;

FIG. 6 a section of the self-inking stamp according to FIG. 4 along line VI-VI in FIG. 5;

FIG. 7 a section of the self-inking stamp according to FIG. 4 along line VII-VII in FIG. 6; and FIG. 8 a detailed view of the section according to FIG. 7 corresponding to the detail VIII in FIG. 7.

DETAILED DESCRIPTION OF PREFERRED EMBODIMENTS

Figure 3:
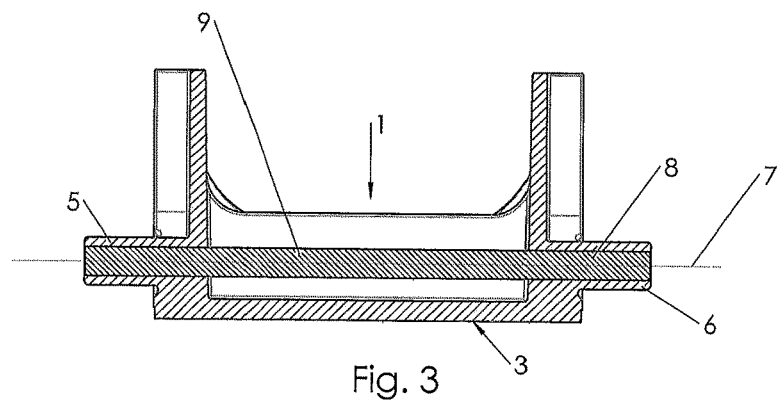
FIG. 3 a section of the plate support according to FIG. 1 along line in FIG. 2.
Figure 2:
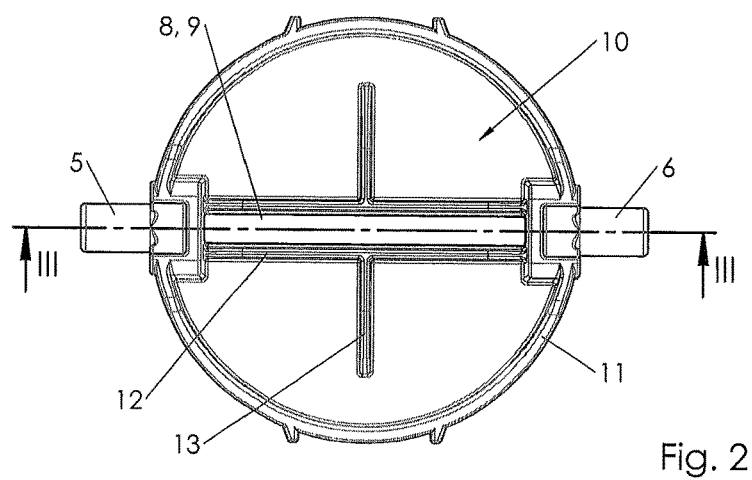
FIG. 2 a plan view onto a back side of the plate support according to FIG. 1.
Figure 1:
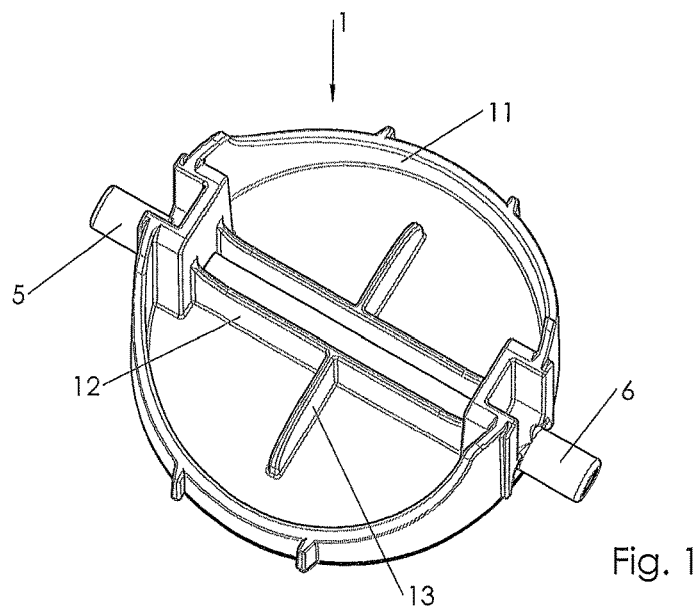
FIG. 1 an axonometric representation of a plate support according to the invention for a self-inking stamp.
Figure 4:
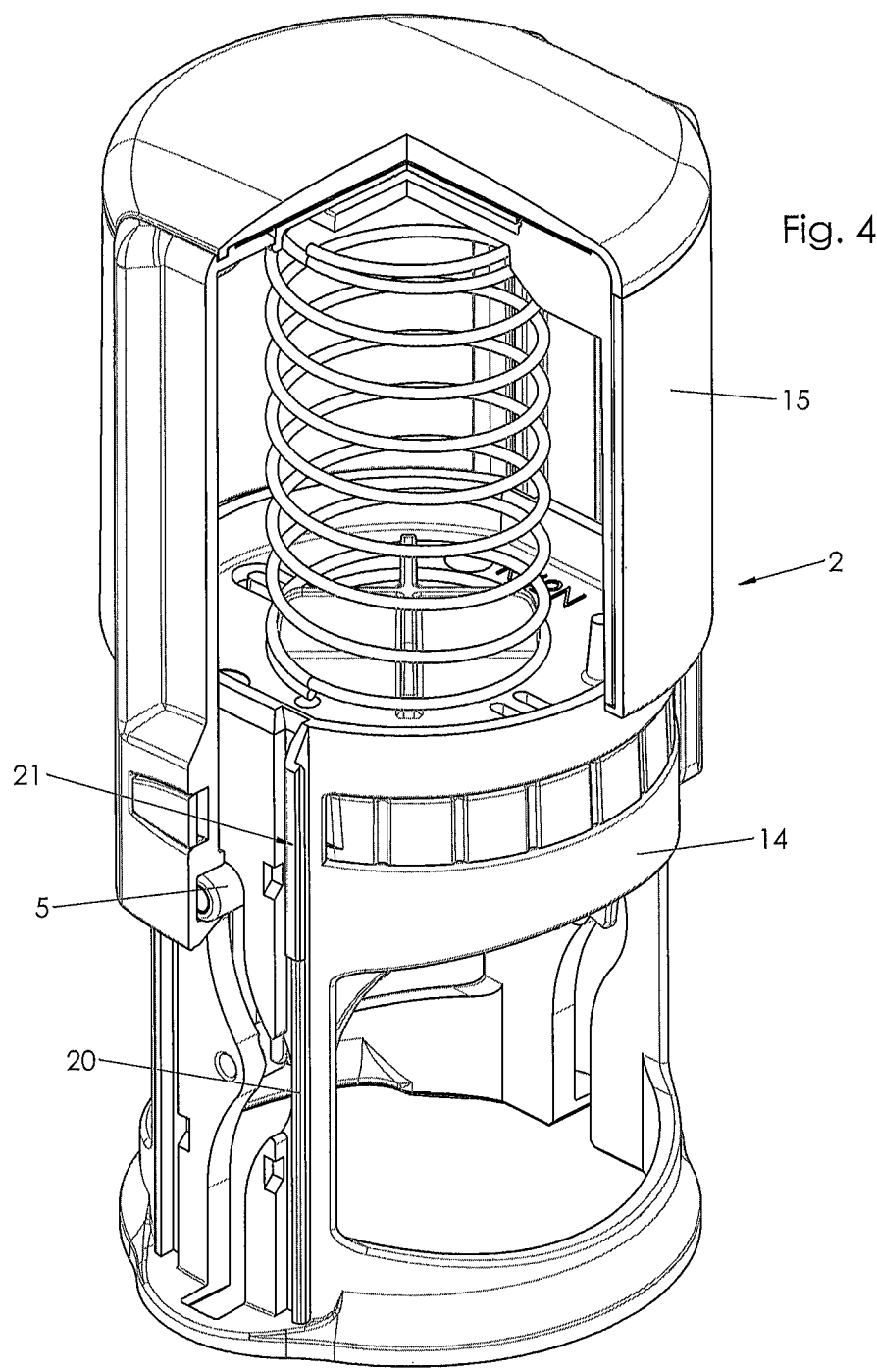
FIG. 4 an axonometric, partially sectional representation of a self-inking stamp according to the invention with a plate support according to FIG. 1.

FIGS. 1 to 3 show a plate support 1 according to the invention for a self-inking stamp 2 (cf. FIG. 4). The plate support 1 has a print side 3 for attaching a text plate (not shown) to the plate support 1. The plate support 1 has two journals 5, 6 defining a swiveling axis 7 of the plate support 1. The journals 5, 6 are integrally formed with the plate support 1. When used in a self-inking stamp 2, the plate support 1 is mounted to swivel about the swiveling axis 7 (cf. FIG. 6).

The plate support 1 furthermore comprises a reinforcing axle 8. In the represented embodiment, the reinforcing axle 8 penetrates the two journals 5, 6 completely and flushes at both ends with the ends of the respective journals 5, 6. A central part 9 of the reinforcing axle 8 is accessible and visible between the journals 5, 6 from a back side 10 of the plate support 1, the back side 10 being opposite the print side 3 (cf. FIG. 2). The reinforcing axle 8 in this example consists of steel, and the rest of the plate support of POM. The shape of the reinforcing axle 8 essentially corresponds to a cylindrical bar. The journals 5, 6 enclose the ends of the reinforcing axle 8 like cylindrical tubes.

For better distributing the force transmitted during the printing of the stamp, the plate support 1 has a frame 11 surrounding the circumference, and longitudinal bracings 12 and transverse bracings 13 at the back side 10.

FIGS. 5 to 8 show a self-inking stamp 2 according to the invention with a housing 14 and an actuating part 15 in the form of an actuating bow. The actuating part 15 is shiftable with respect to the housing 14 along an axis of translation 16 (cf. FIG. 6). A plate support 1 according to FIG. 1 is coupled with the actuating part 15 by the journals 5, 6 being received in corresponding bearing recesses at the inner side of the actuating part 15 (cf. FIG. 4).

The housing 14 comprises, in two opposite side walls 17, 18, one guiding slot 19 each for receiving the journals 5, 6 of the plate support 1. At the outer side of the two side walls 17, 18, two guide rails 20 each for guiding the actuating part 15 are provided. The guide rails 20 are arranged along or in parallel with the axis of translation 16.

Each one of the four guide rails 20 comprises a profile section 21 in an upper region of a half of the guide rail 20, the half facing the actuating part 15. In the region of this profile section 21, the guide rail 20 has an L-shaped profile in a plane transverse to the direction of translation 16 (cf. FIGS. 7 and 8). The L-shaped profile forms a groove between a first leg 22 and a second leg 23, the first leg 22 being arranged in parallel to the swiveling axis 7 of the plate support 1, and the second leg 23 being arranged transverse to the swiveling axis 7 of the plate support 1. Between the legs 22, 23, a groove is formed which is arranged in the direction transverse to the swiveling axis 7 of the plate support 1.

The actuating part 15 comprises, at its inner side, four bearing bushes 24 each corresponding to the profile section 21 of a guide rail 20. Each one of the bearing bushes 24 also has an L-shaped bush profile in a plane transverse to the direction of translation 16 which profile corresponds to the assigned groove (cf. FIGS. 7 and 8). The bush profile comprises, just as the groove, a first leg 25 and a second leg 26 which are arranged in parallel or transverse to the swiveling axis 7 of the plate support 1.

In the rest position of the self-inking stamp represented in FIGS. 4 to 8, the bearing bushes 24 of the actuating part 15 are each engaged with a profile section 21 of the guide rails 20 at the housing 14. To be more precise, the second legs 23, 26 of the L-shaped profiles are engaged in this position (cf. FIG. 8). This position corresponds to a blocking position, i.e. the side walls of the actuating part 15 are blocked with respect to the side walls 17, 18 of the housing 14 against a movement parallel to the swiveling axis 7 of the plate support 1. The self-inking stamp 2 cannot be bent open in this position.

What is claimed is:

1. A plate support for a self-inking stamp comprising:
   (a) a plate support body having a print side for attaching a text plate on the plate support body;
   (b) first and second journals integrally formed with the plate support body and defining a swiveling axis; and
   (c) a reinforcing axle at least partially penetrating the first and second journals;
   wherein the plate support body is mounted to swivel about the swiveling axis when used in the self-inking stamp.

2. The plate support according to claim 1, wherein the reinforcing axle completely penetrates the journals.

3. The plate support according to claim 2, wherein the reinforcing axle has ends flush with ends of the first and second journals, respectively.

4. The plate support according to claim 1, wherein a central part of the reinforcing axle between the first and second journals is accessible from a back side of the plate support body, the back side being opposite the print side.

5. The plate support according to claim 4, wherein the central part is visible from the back side.

6. The plate support according to claim 1, wherein the reinforcing axle is made of metal.

7. The plate support according to claim 6, wherein the reinforcing axle is made of steel.

8. A self-inking stamp comprising:
   (a) a housing;
   (b) an actuating part shiftable with respect to the housing along an axis of translation; and
   (c) a plate support coupled with the actuating part;
   wherein the plate support comprises a plate support body having a print side for attaching a text plate on the plate support body, first and second journals integrally formed with the plate support body and defining a swiveling axis, and a reinforcing axle at least partially penetrating the first and second journals;
   wherein the plate support body is mounted to swivel about the swiveling axis;
   wherein the housing comprises one guiding slot each in opposite first and second side walls, respectively, for receiving the first and second journals of the plate support;
   wherein at least one guide rail is provided at at least one of the first and second side walls for guiding the actuating part along the axis of translation;
   wherein at least one profile section of the at least one guide rail and a bearing bush corresponding to the at least one profile section at the actuating part are formed such that the bearing bush is engaged with the at least one guide rail in the at least one profile section in a blocking position such that the bearing bush is blocked against a movement parallel to the swiveling axis of the plate support.

9. The self-inking stamp according to claim 8, wherein the at least one guide rail comprises, in a region of the at least one profile section, an oblong indentation formed in a direction transverse to the swiveling axis of the plate support, and wherein the bearing bush comprises a bush profile corresponding to the indentation.

10. The self-inking stamp according to claim 9, wherein the oblong indentation comprises a groove.

11. Self-inking stamp according to claim 9, wherein the at least one guide rail in the at least one profile section has a guide rail profile comprising first and second guide rail legs, wherein the bearing bush has a bearing bush profile corresponding to the guide rail profile comprising first and second bearing bush legs, wherein the first guide rail leg and the first bearing bush leg are parallel to the swiveling axis of the plate support, and wherein the second guide rail leg and the second bearing bush leg are transverse to the swiveling axis of the plate support and are engaged in the blocking position.

12. The self-inking stamp according to claim 8, wherein the at least one guide rail has a first half facing the actuating part and a second half and wherein the at least one profile section of the at least one guide rail extends only in the first half of the at least one guide rail.

* * * * *